United States Patent Office 3,312,736
Patented Apr. 4, 1967

3,312,736
METHOD OF MAKING POLYMETHYLOL-ALKANOIC ACIDS
Robert J. Ruhf, Allentown, Pa., assignor to Trojan Powder Company, Allentown, Pa., a corporation of New York
No Drawing. Filed July 29, 1963, Ser. No. 298,476
17 Claims. (Cl. 260—530)

This invention relates to an improved method for the preparation of certain polymethylolalkanoic acids; and, more particularly, the invention relates to an improved method for the preparation of dimethylolalkanoic acids containing from five to seven carbon atoms and trimethylolacetic acid.

Di- and trimethylolalkanoic acids, such as $\alpha,\alpha$-dimethylolalkanoic acids, and trimethylolacetic acid, are known. Such acids may be used in the preparation of alkyd resins according to the subject matter disclosed and claimed in copending application Ser. No. 260,031 filed Feb. 20, 1963. However, heretofore such polymethylolalkanoic acids have not been available in quantities sufficient to support commercial application. The limited availability of these compositions is due in part to the failure to develop a commercially attractive method for their preparation.

Some of the first work conducted in the preparation of dimethylolalkanoic acids was reported by Koch et al. (Monatsh. Chem., 22, 443–59, 1901) who disclosed preparing $\alpha,\alpha$-dimethylolpropionic acid by first condensing two mols of methanal (formaldehyde) with one mol of propanal (propionaldehyde) in a basic aqueous solution to produce dimethylolpropanal. Dimethylolpropanal was then converted to the corresponding oxime by reaction with hydroxylamine. The oxime was then treated with acetic anhydride to produce the corresponding diacetylated nitrile which was hydrolyzed to dimethylolpropionic acid. It has been suggested to prepare trimethylolacetic acid in an analagous manner.

Vieregge et al. (Rec. Trav. Chem., 78, 921–8, 1928) report that shaking an acetylenic ether and a carbonyl compound together in the presence of tripopylamine gives a mixture containing an ester of a dimethylolalkanoic acid which may be hydrolyzed to the acid. Reaction of methylacetylenyl ether with excess methanal yielded 19% of the ester of dimethylolpropionic acid.

Neunhoeffer et al. (Chem. Ber., 95, 102–7 (1962)) reported various methods for preparing small amounts of various dimethylolalkanoic acids including the oxidation of dimethylolbutanal with aqueous hydrogen peroxide in acetone by which a yield of just under 10% of dimethylolbutyric acid was obtained.

Methods such as those described in the above-mentioned papers proved to be too elaborate and costly and unsatisfactory from the yield standpoint for commercial application. However, since various polymethylolalkanals were readily obtained by the condensation of formaldehyde with various other alkanals in a basic solution, it would appear that these alkanals would be suitable raw materials for the preparation of the corresponding polymethylolalkanoic acids by oxidation thereof. However, it was discovered that conventional methods for oxidizing alkanals to acids, i.e. with chromic acid, potassium permanganate, catalytic oxidation with oxygen, and the like, failed to produce the desired acid, but rather, resulted in substantially complete destruction of the alkanal.

The oxidation of the dimethylolalkanals with hydrogen peroxide was also attempted. As stated above, Neunhoeffer et al. (supra) reported oxidizing dimethylolbutanal with aqueous hydrogen peroxide in acetone; however, by their method a yield of just under 10% of dimethylolbutyric acid was obtained. The conversion of certain alkanals to the corresponding acids in an acid medium through the intermediate alkanal-hydrogen peroxide addition product was reported by Payne et al. (J.A.C.S., 63, 226–8 (1941)). For example, benzanal was readily converted to benzoic acid by oxidation with hydrogen peroxide. However, attempts to convert pivanal, i.e. $\alpha,\alpha$-dimethylpropanal, and glycol alkanal, i.e. hydroxyacetanal, to the corresponding acids resulted mainly in decomposition of the alkanals. From this work, therefore, one would be lead to conclude that aliphatic alkanals having a tertiary carbon atom, alpha to the alkanal group, such as pivanal, and/or one or more OH groups near the alkanal group, such as glycol alkanals, could not be readily oxidized to the corresponding acid, but rather, tended to decompose, especially under the influence of hydrogen peroxide.

It is the principal object of the present invention to provide an improved method for producing certain di- and trimethylolalkanoic acids.

A further object of the present invention is to provide a method for converting $\alpha,\alpha$-dimethylolalkanals, containing from five to seven carbon atoms, and trimethylolethanal to the corresponding acids in relatively high yields.

Another object of the invention is to provide a novel method for oxidizing $\alpha,\alpha$-dimethylolalkanals, containing from five to seven carbon atoms, and trimethylolethanal with hydrogen peroxide to provide a reaction product containing the corresponding acid which can be employed in the production of synthetic resins.

A further object of the invention is to provide a commerically attractive method for preparing dimethylolalkanoic acids containing from five to seven carbon atoms and trimethylolacetic acid.

A still further object of the invention is to provide certain di- and trimethylolalkanal-hydrogen peroxide reaction products suitable for use in preparing alkyd resins.

These and other objects will become evident from a consideration of the following specification and claims.

The method of the present invention comprises, mixing an aqueous solution of at least one polymethylolalkanal selected from the group consisting of $\alpha,\alpha$-dimethylolalkanals having from five to seven carbon atoms and trimethylolethanal with an aqueous solution of hydrogen peroxide, the mol ratio of hydrogen peroxide to polymethylolalkanal being between about 0.4 and about 1 of the former per mol of the latter, and the solvent in the resulting reaction mixture for said polymethylolalkanal and said hydrogen peroxide consisting essentially of water; and thereafter maintaining the resulting mixture at a pH between 3 and about 9 and at a temperature from about 40° C. to the boiling point, until the mixture is substantially free of peroxide. The resulting solution contains the polymethylolalkanoic acid corresponding to the polymethylolalkanal employed. In certain cases the solution may be utilized as such, as in the preparation of alkyd resins, or it may be subjected to further treatment, such as evaporation and further refinement including the isolation of the acid product.

Herein, the stated $\alpha,\alpha$-dimethylolalkanals and trimethylolethanal, as a group, will be referred to as polymethylolalkanals, and the corresponding acids, as a group, will be referred to as polymethylolalkanoic acids.

An important advantage of the present invention is that it provides a unique, efficient method for converting the polymethylolalkanals to the corresponding polymethylolalkanoic acids. A further advantage of the invention is that these acids are produced in unexpectedly high yields which have not been obtained by methods used heretofore. It has also been found that the entire oxidized reaction product of the present process, containing not only the polymethylolalkanoic acid but various other polymethylolalkanal-hydrogen peroxide reaction products, can advantageously be employed in the preparation of certain alkyd resins. Accordingly, costly and elaborate purifying techniques are not necessary to separate the acid from the reaction product when the product is to be used as a reactant in the preparation of these resins, and the loss inherent in purification is avoided. Where the total reaction product can be used, a substantial saving in the cost of raw materials is also achieved, since it is not necessary to use a highly purified polymethylolalkanal reactant in the present method. Quite unexpectedly, it has been discovered that the polymethylolalkanal-containing condensation reaction product resulting directly from the reaction of methanal and the appropriate alkanal in the presence of a basic catalyst, and containing formates, carbonates, alkali metals, alkaline earth metals, and the like, can be employed as the source of the polymethylolalkanal in the present process, while unexpectedly high yields of the oxidized reaction product are obtained.

The polymethylolalkanals suitable for use in the method of the present invention are saturated aliphatic alkanals having:

(1) a tertiary carbon atom, alpha to the aldehyde group,
(2) Two or three methylol groups attached to the alpha carbon atom,
(3) A total of at least five and up to seven carbon atoms, and
(4) The following formula:

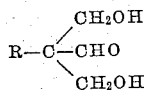

wherein R is selected from the group consisting of alkyl groups having from one to three carbon atoms and a methylol group, —CH$_2$OH.

From the foregoing it will be seen that the polymethylolalkanal reactant may be an α, α-dimethylolalkanal containing from five to seven carbon atoms or trimethylolethanal. The dimethylolalkanals can be prepared by condensing one mol of an alkanal having from three to six carbon atoms with two mols of methanal; and trimethylolethanal can be prepared by condensing one mol of ethanal with three mols of methanal. The reaction takes place in aqueous medium and in the presence of an alkaline catalyst, such as an alkali metal carbonate, an alkali metal hydroxide, an alkaline earth metal hydroxide or a strongly basic anion exchange resin in the carbonate form, usually the former, especially sodium or potassium carbonate. The pH provided by the alkaline catalyst will be between about 8 and about 10. In the reaction, propanal and methanal form dimethylolpropanal; butanal and methanal form dimethylolbutanal; N-pentanal and methanal form dimethylolpentanal; 3-methylbutanal and methanal form dimethylol-3-methylbutanal, and ethanal and methanal form trimethylolethanal. This condensation reaction is exothermic and fairly rapid. It is normally carried out by mixing the ingredients, with a slight excess, such as 3–10% excess, of methanal, in aqueous medium at room temperature or somewhat below, after which, during the course of the reaction, the temperature is allowed to rise to within the range of about 30 to about 60° C.

Commercial formalin (37% aqueous methanal) is a readily available, satisfactory source of methanal. The alkanals used in the condensation reaction include ethanal, propanal, butanal, 3-methylbutanal and pentanal. All of these alkanals are colorless liquids at room temperature and are sufficiently soluble in water to initiate the condensation reaction.

Upon completion of the condensation reaction, excess water and certain low boiling constituents of the reaction mixture can be removed by evaporation or distillation, including vacuum distillation. The residue remaining contains the polymethylolalkanal, and may also contain small amounts of sodium formate or other alkali- or alkaline earth metal formates, carbonates, hydroxides and the like depending upon the alkaline catalyst employed. The complete removal of these impurities or the separation of the polymethylolalkanal from them can be rather complicated and expensive. It has been found, however, that the presence of one or more of these compounds is actually beneficial in carrying out the present method where an excess of methanal in the upper portion of the above-mentioned range, that is above 5% and up to 10% excess of methanal, is used in the condensation reaction. While the exact reason for this is not fully understood, the following theory is presently believed by me to apply. Free methanal associated with the polymethylolalkanal can itself become oxidized, during the oxidation process of the present invention, to formic acid which in turn can force the pH of the reaction mixture down to a point, below 3, where reactions occur causing the formation of a white precipitate and adversely affecting the yield of the desired polymethylolalkanoic acid. Where little or no free methanal is present with the polymethylolalkanal there is little or no problem; and, in this case, the polymethylolalkanal used in the present method may be substantially free of such inorganic compounds as by having been produced using a strongly basic anion exchange resin as the alkaline condensation catalyst or by carrying out the condensation reaction in the presence of the aforementioned alkali- or alkaline earth metal basic catalyst followed by deionization with ion exchange resin. However, with amounts of methanal resulting from the use of the above-mentioned excess, precautions should be taken to counteract the formation of detrimental amounts of formic acid. Alkali- and alkaline earth metal formates act as buffers, preventing the deleterious affect. Basic carbonates and hydroxides neutralize formic acid as formed also preventing the deleterious affect. Thus, where the polymethylolalkanal contains a deleterious amount of methanal and also contains any of the stated alkali- or alkaline earth metal compounds, the latter may be retained through the oxidation process of the present invention; and where such polymethylolalkanal initially is substantially free of the alkali- or alkaline earth metal compound, a buffer or base should be added thereto. Such a buffer may be a salt of a strong base and a weak acid, especially sodium- or potassium formate, acetate, citrate, tartrate, and the like. If a base is added, it should be one which will neutralize formic acid under the conditions of the present oxidation reaction, especially sodium or potassium carbonate. The presence of a base during the present oxidation process is not otherwise detrimental since it is neutralized by the polymethylolalkanoic acid formed, and such salt of the polymethlolalkanoic acid can subsequently be converted to the free acid, as by treatment with a cation exchange resin. However, should the polymethylolalkanal be alkaline, it is preferably substantially neutralized with one of the stated weak organic acids, especially formic acid, before oxidation according to the present invention.

In carrying out the oxidation process of the present invention, the polymethylolalkanal is used in the form of an aqueous solution, in a concentration ranging between about 10 and about 75%, by weight. A concentration in the lower portion of this range, that is, between about 10 and about 30% is preferred. When an aqueous solution of polymethylolalkanal with a concentration in the stated lower end of the range is employed in the process of the present invention, the exothermic oxidation reaction may be more readily controlled, thus minimizing decomposition of the reactants and/or products. At these lower concentrations, the high proportion of water can be tolerated with little appreciable adverse effect and excess water may be removed upon completion of the reaction by evaporation.

Hydrogen peroxide, suitable for use in the process of the present invention is available commercially in aqueous solutions of concentrations ranging from about 3% to about 90% by weight. Generally, these hydrogen peroxide solutions are essentially free from impurities and particularly metallic impurities since the decomposition of hydrogen peroxide is readily catalyzed by such impurities. Hydrogen peroxide is fundamentally unstable and the commercial solutions of hydrogen peroxide available will therefore usually contain a preservative such as acetophenetidin or acetanilide. Concentrated solutions of hydrogen peroxide are difficult to handle and tend to react explosively with combustible materials. Therefore, aqueous solutions of hydrogen peroxide having concentrations below about 55%, especially those commercially available solutions having concentrations ranging from about 27 to about 50%, are preferred. Commercial hydrogen peroxide solutions in water are weakly acid, the pH of the solution decreasing with increasing concentrations of hydrogen peroxide. However, this acidity is weak and is readily substantially overcome when the solution is mixed with the aqueous solution of the polymethylolalkanal, especially when buffered as mentioned herein.

The mol ratio of hydrogen peroxide to polymethylolalkanal has been found to be fairly critical, and although a mol ratio between about 0.4 and about 1 mol of hydrogen peroxide per mol of polymethylolalkanal can be employed, a mol ratio of between about 0.5 and about 0.8 mol of hydrogen peroxide per mol of polymethylolalkanal is found to produce the best yields, that is, yields running upwards of 60% (of theoretical). At a mol ratio of hydrogen peroxide to polymethylolalkanal of less than 0.4:1, the yield drops off sharply. At mol ratios greater than about 0.8:1 there is a less appreciable effect on the yield at first: however, a sharp decrease in yield is noted at mol ratios about 1:1.

As stated, in carrying out the method of the present invention, an aqueous solution of the polymethylolalkanal and an aqueous solution of hydrogen peroxide are mixed in a proportion to provide a mol ratio of hydrogen peroxide to polymethylolalkanal as described above. The ensuing reaction is exothermic and will readily take place to completion at a temperature between about 40° C. and the boiling point of the mixture. The degree of control over the reaction, as will be apparent, will depend upon the concentration of the reactants in the reaction mixture, the more dilute within the above-mentioned ranges the easier the control. For this reason, the concentration of the reactants in their respective solutions may also have a bearing on the temperature of the respective solutions at the time they are brought together. With the more dilute solutions in the above-mentioned concentration ranges, the temperature of each reactant solution may be as high as 60° C. However, since the solutions may be obtained from outside holding tanks, the temperature of one or both of the solutions may go as low as ambient atmospheric temperatures, for example as low as 0° C. In most cases, however, the temperature of each reactant solution will be between about 10 and about 30° C.

Once the solutions are mixed, reaction proceeds with the liberation of heat. If the initial mixture is relatively cold, heating thereof to at least 40° C. will initiate the reaction. Thereafter the reaction temperature can be maintained between 40° C. and the boiling point of the mixture, preferably between about 50 and about 100° C., until the reaction is complete. Whether or not heat is added to maintain the reaction will depend upon the heat balance as well known to those skilled in the art. Advantageously, before completion of the process and during the latter portion thereof, the mixture is heated to the upper portion of the above-stated temperature ranges, say to between about 80 and about 100° C., to insure completion of the reaction and of the removal of unreacted hydrogen peroxide. In this connection, one procedure found particularly suitable is to mix the reactant solutions, each having a temperature below 30° C., heat the mixture to between 40 and 60° C. to initiate the exothermic reaction, remove the source of heat until the exothermic reaction substantially ceases as determined, for example, by the substantial cessation of the evolution of gas (believed to be a mixture of hydrogen, oxygen and carbon dioxide), then heat further to between about 80 and about 100° C. until the reaction is substantially complete.

During at least the main course of the reaction the reaction mixture is agitated. The agitation may be gentle, as by slow stirring, ebullition through the use of high temperatures or gentle turbulence through the evolution of gas, and the like, or may be more violent, as through the use of a high speed stirrer. The agitation may be continuous or intermittent, and may be a combination of two or more of the above mentioned means. During the main course of the reaction gas is evolved and this gas evolution may be relied upon, through the mild turbulence caused thereby, to provide at least a portion of the agitation. Preferably mechanical agitation through the use of a stirrer is also employed.

Water is the solvent employed in the reaction medium so that the system will be substantially completely aqueous, as distinguished from the use of an organic solvent, like acetone, or even a mixed solvent system containing water and an appreciable amount of an organic solvent, like acetone.

The pH of the reaction mixture should be maintained at 3 or above for reasons set forth hereinabove. The pH may even, at least initially, be on the alkaline side such as up to about 9 since the polymethylolalkanoic acid formed during the reaction will bring the pH down and the salt of the polymethylolalkanoic acid can easily be converted subsequently to the free acid. Preferred pH conditions are between about 5 and about 7. Maintenance of the desired pH conditions will present no problem since simple buffering salts of the type mentioned hereinabove and bases, as also mentioned above, may be employed. Salts of the polymethylolalkanoic acid, such as the sodium and potassium salts formed by the presence of sodium- or potassium carbonate or hydroxide in the reaction mixture, will themselves have a buffering effect to maintain the pH in the desired range. The amount of buffer, either present in the polymethylolalkanal reactant, added as such or formed in situ through neutralization of a base, may vary widely. Amounts as low as 0.8%, by weight, based on the weight of the polymethylolalkanal have been found useful, and as high as 30%, on the same basis may be used.

The process will generally be carried out at atmospheric pressure; however, subatmospheric pressures may be used, for example as an aid in removing water, especially during the latter portion of the reaction. Although the process is preferably carried out batch-wise, with suitable equipment a continuous process can be employed.

The end point of the oxidation reaction of the present invention is the disappearance of peroxide from the reaction mixture; that is, where there is no longer any detectable peroxide remaining in the reaction mixture. This can be determined by mixing a small sample of the reaction mixture with an equal volume of a 10% aqueous solution of potassium iodide. A yellow or orange coloration means the presence of peroxide (hydrogen peroxide or other, possibly more complex, peroxide), and the reaction should be continued until a test mixture remains substantially colorless showing that the reaction mixture is substantially free of peroxide and the reaction is substantially complete.

The amount of polymethylolalkanoic acid present in the resulting aqueous reaction mixture may be determined readily by the acid number thereof. For example, 1 gram of dimethylolpropionic acid (molecular weight 134.13) possesses a neutralization equivalent of approximately 298.3 mg. of sodium hydroxide. Corresponding neutralization equivalents for other dimethylolalkanoic acids can be readily determined, for example, one gram samples of dimethylolbutyric and dimethylolvaleric acids possess neutralization equivalents of 270.1 and 246.7 mg.

sodium hydroxide respectively. One gram of trimethylolacetic acid has a neutralization equivalent of 266.3 mg. of sodium hydroxide.

Metal ions present in the resulting reaction mixture can be removed by treatment with cation exchange resin. This step is especially necessary when the polymethylolalkanoic acid-containing reaction product is to be used in preparing synthetic resins. Thus, by this step the ash content of the reaction product should be reduced to below 0.2%, by weight, based on the weight of the solids in the reaction product.

The acidity of the cation exchange resin is not critical since even weakly acidic resins will remove inorganic alkali and alkaline earth metal cations which may be present. Typical cation resins suitable for this process are those which contain sulfonic acid groups in the resin molecule; substituted on an aromatic isocyclic or heterocyclic ring or an aliphatic chain which may itself be substituted on an aromatic ring. These resins are prepared by interaction of an alkanal, a phenol and sulfuric acid or a sulfite, or, by sulfonating a resin having an aromatic ring in the molecule such as tannin-alkanal, phenolalkanal and styrene-divinylbenzene resins. Typical resins of this class are described in U.S. Patent 2,204,539 to Wassenegger et al., U.S. Patent 2,366,007 to D'Alelio and U.S. Patent 2,372,233 to Thurston. Nuclear sulfonic acid type resins available commercially are Amberlite IR–120, Dowex 50, Permutit Q and Malcite HGR.

From the standpoint of handling during the cation exchange treatment, it is desirable that the solution have a dissolved solids content within the range of about 30 to about 50%, by weight, after separation of any suspended solid materials present. This may require dilution of the solution with water. The effluent may thus have a higher water content than is desired and if so, water is readily removed by evaporation, including distillation. After removal of metal ions, if desired, the reaction mixture can be evaporated with subsequent cooling. In the case of dimethylolpropionic acid, the solid acid can be recovered by simple filtration. The other polymethylolalkanoic acids may be recovered by solvent extraction from the reaction product; as by using butyl acetate with dimethylolbutyric acid, benzene with dimethylolvaleric acid and a mixture of ethanol and benzene with trimethylolacetic acid.

The polymethylolalkanoic acids and the reaction products containing these acids are relatively stable and can be stored at room temperature for prolonged periods. All of these materials are water soluble. The total reaction product, after removal of metal ions and with or without evaporation to substantial dryness, may be used to prepare alkyd resins, as can more refined or isolated forms of the acid. Thus, the characteristics of the resultant resin prepared from the total dimethylolpropionic acid-containing reaction product from which the metal ions have been removed are substantially similar to a resin produced from a relatively pure dimethylolpropionic acid with the exception that the former is slightly darker in color than the latter.

The method of the present invention will be more readily understood from a consideration of the following specific examples which are given for the purpose of illustration only, and are not intended to limit the scope of the invention in any way.

Example I 1033 g. of a 22.8%, by weight, aqueous solution of dimethylolpropanol (containing 2 mols of the alkanal) at room temperature is placed in a glass reaction vessel equipped with a stirrer, thermometer and heating mantle. 113 g. (one mol) of hydrogen peroxide as a 30%, by weight, solution at ambient temperature are added to the reaction vessel and the resultant mixture warmed gently, with stirring, until a spontaneous exothermic reaction is started. The external heat is then removed until the spontaneous exothermic reaction ceases, at which time the heat is reapplied and the temperature of the stirred mixture is raised to about 95° C. where it is held until a total of 8 hours have elapsed since the start of the initial mixing of the reactants. After treating with nuclear sulfonic acid cation exchange resin (Nalcite HGR), evaporating and cooling, a 46.1% yield of crystalline dimethylolpropionic acid (92% pure) is obtained.

The dimethylolpropanol solution used in this example is prepared as follows: 365.2 g. of formalin (containing 127.3 g. of methanol and 237.9 g. of water), 483.5 g. of water and 42.4 g. of sodium carbonate are mixed and the mixture cooled to 20° C. 118.7 g. of propanal are then added with mixing over a period of two hours and the temperature held at 30° C. until a total of 29 hours have elapsed since the start of the propanal addition. The resulting solution is neutralized to pH 6 with formic acid.

Example II 822.2 g. of a 28.7%, by weight, aqueous solution of dimethylolpropanal (containing 2 mols of the propanal) at room temperature are mixed with 113 g. (one mol) of hydrogen peroxide as a 30%, by weight, solution at ambient temperature and the resultant mixture is warmed gently, with stirring, until a spontaneous exothermic reaction starts. The external heat is removed until the spontaneous reaction ceases at which time the heating is resumed and the temperature of the stirred mixture is maintained at 95° C. until 5.5 hours have elapsed since the start of the initial mixing. After treating with nuclear sulfonic acid cation exchange resin (Nalcite HGR), evaporating, and cooling, a 45.75% yield of crystalline dimethylolpropionic acid (92.5% pure) is obtained.

The dimethylolpropanal solution used in this example is prepared as in Example I except that the added water is reduced from 483.5 g. to 271.3 g.

Example III 6.46 mols of dimethylolpropanal (as an aqueous solution of substantially 50% strength) is combined with 3.23 mols of hydrogen peroxide (as a 30% aqueous solution) at room temperature. The mixture is warmed gently, with stirring, until a spontaneous exothermic reaction is initiated. The external heat is then removed until the spontaneous reaction ceases, at which time the heating is resumed and the temperature of the stirred mixture is maintained at about 95 C. until 13 hours have elapsed since the start of the initial mixing. After treating with nuclear sulfonic acid cation exchange resin (Nalcite HGR), evaporating, cooling and filtering, a 63.4% yield of dimethylolpropionic acid (92% pure) is obtained.

The dimethylolpropanal solution used in this example is prepared as follows: 71.6 lbs. of formalin (containing 24.7 lbs. of methanal and 46.9 lbs. of water), 175.4 lbs. of water and 5.5 lbs. of potassium carbonate are mixed and the mixture cooled to 20° C. 23.9 lbs. of propanal are then added with stirring over a period of two hours and the temperature held at 30° C. until a total of 6¼ hours have elapsed from the start of adding the propanal. The solution is then neutralized to pH 7 with formic acid following which the solution is concentrated to 70% dimethylolpropanal. An aliquot portion of this product, containing 6.46 mols of dimethylolpropanal is diluted with wated to 50% concentration.

Example IV 1468.7 g. of an approximately 18%, by weight, aqueous solution of dimethylolbutanal (2 mols) at room temperature are mixed with 113 g. (1 mol) of hydrogen peroxide as a 30%, by weight, aqueous solution at ambient temperature, and the resulting mixture is warmed gently, with stirring, until a spontaneous exothermic reaction is initiated. The external heat is removed until the spontaneous reaction ceases, at which time heating is resumed and the temperature of the stirred mixture is maintained at 95° C. until 12½ hours have elapsed since the start of the initial mixing. The reaction product obtained shows a yield of dimethylolbutyric acid of 54.7% by titration analysis. By treating with nuclear sulfonic acid cation exchange resin, evaporating, recrystallation from butyl acetate and elutriation in isopropyl ether, solid dimethylolbutyric acid (98.3% pure) is obtained having a melting point of 100–102° C.

The dimethylolbutanal solution used in this example is prepared as follows: 364.2 g. of formalin (containing 127 g. of methanol and 237.2 g. of water), 737 g. of water and 42.4 g. of sodium carbonate dissolved in 150 g. of water are mixed and the mixture cooled to 20° C. 150 g. of butanal (2 mols as a 96% solution) are then added slowly over 2 hours, and the mixture is held at 30° C. until a total of 7 hours have elapsed since the beginning of the addition of the butanal. The solution is then neutralized to pH 6 with formic acid.

*Example V*

1495 g. of a 19.5% aqueous solution of dimethylolpentanal (2 mols) at room temeprature are mixed with 113 g. (1 mol) of hydrogen peroxide as a 30%, by weight aqueous solution, and the resultant mixture is warmed gently, with stirring, until a spontaneous exothermic reaction is initiated. The external heat is removed until the spontaneous reaction ceases at which time the heating is resumed and the temperature of the stirred mixture is maintained at 95° C. until a total of 7 hours have elapsed since the beginning of the initial mixing. The reaction product obtained shows a yield of dimethylolvaleric acid of 52% by titration analysis. By treating with nuclear sulfonic acid cation exchange resin, evaporating under vacuum to dryness, recrystallization from benzene and elutriation in isopropyl ether, solid dimethylolvaleric acid (94% pure) is obtained melting at 92–96° C.

The dimethylolpentanal solution used in this example is prepared in the same manner as is the dimethylolbutanal solution in Example IV, except that in this case 180 g. of pentanal (2 mols as 96% solution) is used instead of 150 g. of butanal.

*Example VI*

103.8 lbs. of formalin (containing 36 lbs. of methanal and 67.8 lbs. of water), 256.2 lbs. of water and 5.5 lbs. of potassium carbonate are mixed and the mixture cooled to 20° C. 17.6 lbs. of ethanal are then added slowly and the mixture held at 25° C. until 23½ hours have elapsed since the start of the addition of the ethanal. The solution is then neutralized to pH 6 formic acid, and is concentrated to 80%, by weight, of trimethylolethanal.

340 g. (2 mols) of this material are diluted to 40% concentration of trimethylolethanal. There are then added, 97 g. (1 mol) of hydrogen peroxide, as a 35%, by weight, aqueous solution, and the mixture is heated gently, with stirring, to initiate a spontaneous exothermic reaction. The external heat is removed until the spontaneous reaction ceases at which time heating is resumed and the temperature is raised to 95° C. until a total of 3 hours have elapsed since the beginning of the addition of the hydrogen peroxide solution. The reaction product obtained shows a yield of trimethylolacetic acid of 62.4% by titration analysis. A product of this type, upon treatment with nuclear sulfonic acid cation exchange resin, evaporation to dryness and recrystallization from a mixture of benzene and isopropyl alcohol gives trimethylolacetic acid (95.5% pure) melting at 189–195° C.

*Example VII*

Following the procedure outlined in Example III for the preparation of the dimethylolpropanal, a dimethylolpropanal solution is prepared using 3% excess methanal over the theoretical stoichiometric requirement. The solution is then deionized by being treated with nuclear sulfonic acid cation exchange resin (Nalcite HGR of Dow Chemical Co.) and with a weakly basic anion exchange resin (aminated chlormethylated polystyrene containing primary, secondary and tertiary amine groups as the functional groups, Amberlite IR–45 of Rohm and Haas Co.).

An aliquot of the solution containing 2 mols of dimethylolpropanal and adjusted to a concentration of 50% is combined with 1 mol of hydrogen peroxide in the form of a 30% by weight, aqueous solution, and the solution is heated at 90–95° C. until free of peroxide. The reaction product obtained shows a yield of dimethylolpropionic acid of 59.8% by titration analysis.

*Example VIII*

Using the materials and same relative proportions employed in praparing the dimethylolpropanal of Example III, except the potassium carbonate, and using 3% excess methanal over the theoretical stoichiometric requirement, the mixture of reactants is passed through a column, 2″ x 11″, of strongly basic quaternary ammonium anion exchange resin made from styrene and divinylbenzene and containing quaternary ammonium groups, (Nalcite SBR of National Aluminate Corp.) regenerated with a solution of 60 grams of sodium carbonate in 1500 ml. of water. The flow rate of reactants is such that 1604 g. of solution flow through the column in an hour.

An eliquot portion of the resulting dimethylolpropanal solution containing 2 gram mols of the dimethylolpropanal and evaporated under low vacuum to 31% concentration, is mixed with 1 mol of hydrogen peroxide, as a 30%, by weight, aqueous solution, as in the preceding examples, and the solution heated to 90–95° C. until free of peroxide, which was a total time of 9½ hours after the initial mixing of the reactants. After evaporating, cooling and filtering, a 49.5% yield of solid dimethylolpropionic acid is obtained.

*Example IX*

In this example the procedure of Example VIII is followed for the preparation of the dimethylolpropanal except that 10% excess methanal is used instead of 3%.

To the resulting dimethylolpropanal solution are added 1.2% by weight, of sodium formate based on the weight of the dimethylolpropanal. The resulting solution is mixed and reacted with 1 mol of hydrogen peroxide as a 35%, by weight, aqueous solution (per 1.86 mols of dimethylolpropanal) as in the preceding examples. Solid dimethylolpropionic acid in a yield of 43.1% is recovered.

Following the same procedure, but adding only 0.8% sodium formate resulted in a 30.2% yield of dimethylolpropionic acid; and failure to add any sodium formate or other buffer or base results predominately in the formation of a white insoluble precipitate and no appreciable dimethylolpropionic acid.

Modification is possible in the selection of conditions and techniques without departing from the scope of the present invention.

I claim:
1. The method of producing a polymethylolalkanoic acid which comprises, mixing an aqueous solution of at least one polymethylolalkanal selected from the group consisting of $\alpha,\alpha$-dimethylolalkanals having from five to seven carbon atoms and trimethylolethanal with an aqueous solution of hydrogen peroxide, the mol ratio of hydrogen peroxide to polymethylolalkanal being between about 0.4 and about 1 of the former per mol of the latter, and the solvent in the resulting reaction mixture for said polymethylolalkanal and said hydrogen peroxide consisting essentially of water; and thereafter maintaining the resulting mixture at a pH between 3 and about 9 and at a temperature from about 40° C. to the boiling point, until the mixture is substantially free of peroxide.

2. The method of claim 1 wherein the mol ratio of hydrogen peroxide to polymethylolalkanal is between about 0.5 and about 0.8 mols of the former per mol of the latter.

3. The method of claim 1 wherein the concentration of polymethylolalkanal in said solution thereof is between about 10 and about 75%, and wherein the concentration of hydrogen peroxide in said solution thereof is between about 3 and about 90%.

4. The method of claim 3 wherein the concentration of polymethylolalkanal in said aqueous solution thereof is between about 10 and about 30%.

5. The method of claim 3 wherein the concentration of hydrogen peroxide in said aqueous solution thereof is below about 55%.

6. The method of claim 5 wherein the concentration of hydrogen peroxide in said aqueous solution thereof is between about 27 and about 50%.

7. The method of claim 1 wherein the pH of the reaction mixture is between about 5 and about 7.

8. The method of preparing a polymethylolalkanoic acid which comprises, mixing an aqueous solution of at least one polymethylolalkanal selected from the group consisting of $\alpha,\alpha$-dimethylolalkanals having from five to seven carbon atoms and trimethylolethanal, at a concentration of polymethylolalkanal in said solution thereof of between about 10 and about 30%, with an aqueous solution of hydrogen peroxide, at a concentration of hydrogen peroxide in said solution thereof of between about 27 and about 50%; the mol ratio of hydrogen peroxide to polymethylolalkanal being between about 0.4 and about 1 of the former per mol of the latter, and the solvent in the resulting reaction mixture for said polymethylolalkanal and said hydrogen peroxide consisting essentially of water; and thereafter maintaining the resulting mixture at a pH between 3 and about 9 and at a temperature from about 40° C. to the boiling point, until the mixture is substantially free of peroxide.

9. The method of claim 8 wherein the mol ratio of hydrogen peroxide to polymethylolalkanal is between about 0.5 and about 0.8 mol of the former per part of the latter.

10. The method of claim 8 wherein the pH of the reaction mixture is between about 5 and about 7.

11. The method of producing a polymethylolalkanoic acid which comprises, mixing an aqueous solution of at least one polymethylolalkanal selected from the group consisting of $\alpha,\alpha$-dimethylolalkanals having from five to seven carbon atoms and trimethylolethanal, at a concentration of polymethylolalkanal in said solution thereof between about 10 and about 30%, with an aqueous solution of hydrogen peroxide, at a concentration of hydrogen peroxide in said solution thereof of between about 3 and about 55%; the mol ratio of hydrogen peroxide to polymethylolalkanal being between about 0.4 and about 1 of the former per mol of the latter, each of said solutions being at a temperature between about 0 and about 60° C., and the solvent in the resulting reaction mixture for said polymethylolalkanal and said hydrogen peroxide consisting essentially of water; and thereafter maintaining the resulting mixture at a pH between 3 and about 9 and at a temperature from about 40° C. to the boiling point until the mixture is substantially free of peroxide.

12. The method of claim 11 wherein the mixture is heated to between about 50 and about 100° C. until substantially free of peroxide.

13. The method of claim 11 wherein each of the initial reactant solutions is at a temperature between about 10 and about 30° C.; and wherein the resulting mixture is heated to a temperature of between about 40 and about 60° C. until evolution of gas from said reaction mixture ceases substantially and thereafter is heated to between about 80 and about 100° C. until the mixture is substantially free of peroxide.

14. The method of claim 1 wherein said polymethylolalkanal is dimethylolpropanal, and wherein the resulting polymethylolalkanoic acid is dimethylolpropionic acid.

15. The method of claim 1 wherein said polymethylolalkanal is dimethylolbutanal, and wherein the resulting polymethylolalkanoic acid is dimethylolbutyric acid.

16. The method of claim 1 wherein said polymethylolalkanal is dimethylolpentanal, and wherein the resulting polymethylolalkanoic acid is dimethylolvaleric acid.

17. The method of caim 1 wherein said polymethylolalkanal is trimethylethanal, and wherein the resulting polymethylolalkanoic acid is trimethylolacetic acid.

References Cited by the Examiner

FOREIGN PATENTS 1,035,639   8/1958   Germany.

OTHER REFERENCES

Riemhchneider et al., "Monatshefte fur Chemie," vol. 88 (1957), pp. 1099–1104, QD1, M73.

Neunhoeffer et al., "Ber. Deut. Chem.," vol. 95 (1962), pp. 102–107, QD1, D4.

LORRAINE A. WEINBERGER, *Primary Examiner.*

RICHARD K. JACKSON, *Examiner.*

KAREN I. ROSE, *Assistant Examiner.*

UNITED STATES PATENT OFFICE
CERTIFICATE OF CORRECTION

Patent No. 3,312,736                                      April 4, 1967

Robert J. Ruhf

It is hereby certified that error appears in the above numbered patent requiring correction and that the said Letters Patent should read as corrected below.

Column 4, line 38, for "proces" read -- process --; column 5, line 32, for "about" read -- above --; column 7, line 68, and column 8, line 9, for "dimethylolpropanol", each occurrence, read -- dimethylolpropanal --; column 8, line 65, for "wated" read -- water --; column 9, line 51, before "formic" insert -- with --; column 10, line 16, for "praparing" read -- preparing --.

Signed and sealed this 7th day of November 1967.

(SEAL)
Attest:

Edward M. Fletcher, Jr.

Attesting Officer

EDWARD J. BRENNER

Commissioner of Patents